United States Patent [19]
Pintauro et al.

[11] Patent Number: 6,079,210
[45] Date of Patent: Jun. 27, 2000

[54] CONTINUOUSLY VARIABLE ELECTRICALLY ACTUATED FLOW CONTROL VALVE FOR HIGH TEMPERATURE APPLICATIONS

[75] Inventors: Arthur C. Pintauro; Donald R. Samuelson; Henri A. Siedow, all of Fort Collins, Colo.

[73] Assignee: Woodward Governor Company, Loveland, Colo.

[21] Appl. No.: 09/118,156

[22] Filed: Jul. 16, 1998

[51] Int. Cl.[7] ............................. F02D 23/00; F02B 47/08
[52] U.S. Cl. ................. 60/602; 123/568.21; 251/129.11
[58] Field of Search ......................... 60/602; 251/129.11, 251/305; 137/338

[56] References Cited

U.S. PATENT DOCUMENTS

| | | | |
|---|---|---|---|
| 2,753,147 | 7/1956 | Welge | 251/233 |
| 4,380,246 | 4/1983 | Casale et al. | 137/375 |
| 4,819,696 | 4/1989 | Takikawa et al. | 137/630.12 |
| 5,085,401 | 2/1992 | Botting et al. | 251/129 |
| 5,148,678 | 9/1992 | Ueda et al. | 60/602 |
| 5,638,926 | 6/1997 | McCrickard | 188/273 |
| 5,738,072 | 4/1998 | Bolte et al. | 123/399 |
| 5,913,329 | 6/1999 | Haynes et al. | 137/338 |

*Primary Examiner*—Henry C. Yuen
*Assistant Examiner*—Mahmoud M. Gimie
*Attorney, Agent, or Firm*—Leydig, Voit & Mayer, Ltd.

[57] ABSTRACT

A continuously variable electrical actuator rotationally coupled to and thermally isolated from a butterfly valve. The butterfly valve may be used to modulate high temperature exhaust gas flow through an engine turbocharger. An electrical actuator provides a continuously variable output to an output shaft. The butterfly valve has its rotary position controlled by an input shaft. The input shaft and output shaft are rotationally coupled through minimum contact points to reduce heat transfer. The connection between input and output shafts also minimizes vibration transfer therebetween. An coupling tube coaxially interposed between the input and output shafts provides a thermal block to further reduce heat transfer. The input and outputs shafts are rotationally coupled to the intermediate shaft by torsion spring mechanisms to allow a limited range of axial translation for the input shaft. The torsion spring mechanisms are preloaded to prevent rotational hysteresis in the butterfly valve.

40 Claims, 5 Drawing Sheets

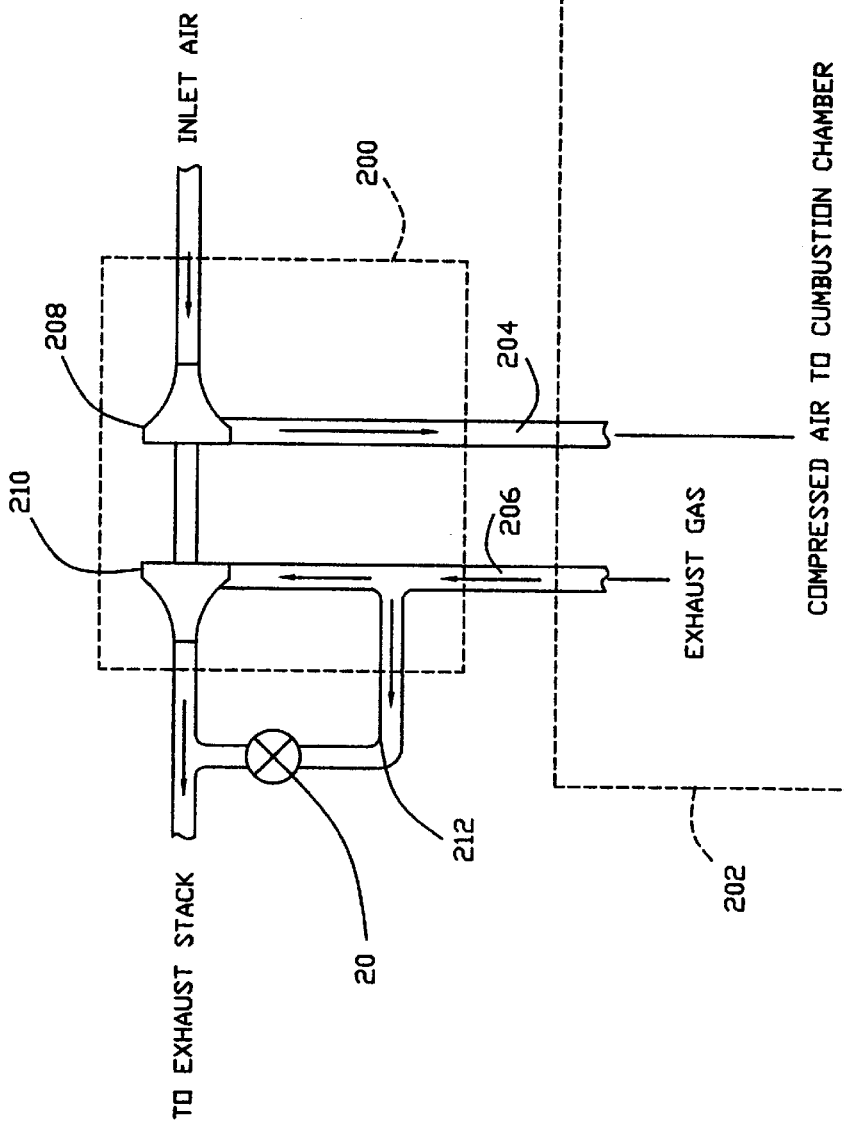

CONTINUOUSLY VARIABLE ELECTRICALLY ACTUATED FLOW CONTROL VALVE FOR HIGH TEMPERATURE APPLICATIONS

FIELD OF THE INVENTION

This invention relates generally to flow control valves and more particularly to continuously variable butterfly valves for applications in engines.

BACKGROUND OF THE INVENTION

There are a number of high temperature applications where fast and accurate control over fluid flow is needed. One exemplary and very significant application is controlling the boost pressure provided by a turbocharger. Turbochargers affect the air fuel (A/F) ratio combusted in the cylinders of modern internal combustion engines, which includes diesel and natural gas engines. Turbochargers include a compressor for compressing air and a turbine for driving the compressor. The turbine operates off of the exhaust flow exiting the engine. To achieve the most efficient engine performance, the boost pressure of the air delivered into the cylinders must be accurately controlled.

One way to obtain better control over the compressor boost pressure is to control the amount of exhaust flowing through the turbine. This can be done by providing a controlled wastegate valve which closely regulates or modulates the amount of exhaust flowing through the turbine. Design of the controlled wastegate valve must take into consideration the harsh environment in which the valve operates. The wastegate valve may be subjected to exhaust gas temperatures of up to 1400° F. Being in close proximity to the combustion chambers, the wastegate valve also must handle the vibration and heat transfer coming from the engine block.

There are known prior attempts of regulating the exhaust flow through the turbines of turbochargers using pneumatically controlled flow control valves. A typical prior attempt includes the use of a pneumatic actuator for controlling the position of a swing valve or poppet valve. The swing or poppet valve regulates the flow of exhaust through an exhaust bypass in the engine turbocharger. While, pneumatic actuators can be configured to withstand the high temperature environment, they provide a slow response with a significant amount of rotational hysteresis resulting from pressure differentials between the valve and the pneumatic actuator. Furthermore, swing and poppet valves have very high gain characteristics, making precise control impracticable. These factors cause deficient control of the turbo boost pressure. This results in inefficient control of the engine turbocharger and lower efficiency for the combustion engine.

In cool temperature applications, such as throttling ambient temperature air into an engine, there are known electrically actuated butterfly valves. Such electrically actuated butterfly valves typically have a single solid shaft which transfers the rotational output of an electrical actuator to the butterfly valve. These electrical actuators are highly responsive which provides fast and accurate control of the butterfly valve and the low temperature gas which flows therethrough. However, the shaft is an excellent conductor of heat and vibration which would cause overheating and/or failure of the electrical actuator if applied to high temperature applications, such as a wastegate flow control valve for regulating exhaust flow to a turbocharger for example.

There are also known attempts at providing electrically actuated butterfly valves for exhaust braking. For example, U.S. Pat. No. 2,753,147, to Welge, illustrates an electrically actuated on/off butterfly valve for building backpressure against the engine pistons to slow the vehicle when the vehicle is traveling down a steep slope. However, the engine braking valve in Welge would not be suitable for controlling turbo boost pressure in an engine. Welge discloses an on/off type valve that is not continuously variable. Such on/off type valves do not provide the control, responsiveness or accuracy necessary for the desired control of turbo boost pressure. Furthermore, the output shaft of the electrical actuator is disposed along a separate axis spaced parallel to the input shaft of the butterfly valve. Rotation is transferred from the output shaft to the input shaft by a spring, roller and track mechanism which causes the input and output shafts to rotate in opposite directions. This connection between input and output shaft increases the complexity of the valve and allows rotational play between shafts which in turn would decrease the responsiveness and control of the butterfly valve.

Yet, another problem with Welge is that it does not appear to be adapted for the harsher environmental conditions necessary for controlling exhaust flow through an engine turbocharger. In Welge, the butterfly valve is adapted to be mounted between the outlet of the exhaust manifold and the inlet of the exhaust line, which can be further downstream from the engine combustion chamber as compared with the typical location of the bypass in an engine turbocharger. This downstream location is a less harsh environment in terms of temperature and vibration as compared with a typical turbocharger bypass. And therefore it does not suffer from the problems to which the instant invention is directed.

SUMMARY OF THE INVENTION

It is therefore the general aim of the present invention to achieve better control over fluid flow in high temperature applications.

It is another aim of the present invention to provide an electrically controlled continuously variable butterfly valve for high temperature applications.

It is a more specific aim of the present invention to provide an electrically controlled continuously variable butterfly valve adapted for high temperature operation in internal combustion and/or turbine engine applications.

In that regard, it is another aim of the present invention to improve control of turbochargers in internal combustion engines.

According to another aspect, an objective of the present invention to utilize electronic control or electrically driven actuation in controlling engine turbochargers.

It is therefore an object of the present invention to minimize heat transfer between a butterfly valve and a continuously variable electrical actuator.

A related object is to accommodate thermal expansion and contraction of the butterfly valve relative to the actuator.

It is another object of the present invention to provide an electrically actuated butterfly valve that can tolerate a substantial amount of vibration.

It is a specific object of the present invention, in a particular embodiment, to provide an electrically controlled butterfly valve that can regulate a gas flow having a maximum temperature of approximately 1400° F.

It is another specific object of the present invention to improve the speed and accuracy of controlling exhaust gas flow through engine turbochargers.

It is another specific object of the present invention to minimize rotational hysteresis in the flow control valve which regulates exhaust gas flow through an engine turbocharger during normal operation thereof.

It is another object of the present invention to provide a compact electrically actuated butterfly valve for high temperature applications that requires only passive cooling.

It is therefore a feature of the present invention to provide an electrically actuated flow control valve for accurate control of fluid flow in high temperature applications. According to this feature, an electrical actuator includes an output shaft that has a rotary position proportionally related to electric signals applied to the electrical actuator. The flow control valve includes an input shaft coupled to a movable valve member to regulate fluid flow through a fluid passage. The input shaft and output shaft are coaxially aligned and rotationally coupled by a coupling tube for direct transfer of rotary movement from the electrical actuator to the flow control valve. The coupling tube serves as a thermal block between the input and output shafts. Coupling means joins the coupling tube to the respective input and output shafts restricting heat transfer therethrough.

It is an aspect of the present invention that the flow control valve is a butterfly valve that includes an annular plate mounted in an annular fluid passage for regulating flow therethrough. The butterfly valve provides far better control over fluid flow through the fluid passage as generally compared to swing or poppet type flow control valves.

It is another feature of the present invention to provide an electrically actuated butterfly valve for modulating high temperature fluid flow in engines. According to this feature, a preferred embodiment provides an electrical actuator having a continuously variable rotational output on an output shaft and a butterfly valve with an input shaft that is connected to the output shaft to receive the continuously variable rotational output. An intermediate shaft or coupling tube couples the input and output shafts while providing a thermal block therebetween.

It is a related feature that the electrical actuator and butterfly valve are fixed by an intermediate housing to provide an integral electrically actuated butterfly valve component. It is a further aspect that the housing includes rows of compliance slots which serve also thermal resistors to reduce heat transfer between the butterfly valve and electrical actuator while providing axial and angular compliance therebetween.

It is another aspect of the present invention that the connection between input and output shafts allows for angular and axial translation therebetween. This allows for small angular and axial displacements and misalignments between the electrical actuator and the butterfly valve, which can be caused by thermal expansion or contraction and vibrations between the butterfly valve and the electrical actuator.

It is another aspect of the present invention to provide a sealing/thrust mechanism on the input shaft of the butterfly valve to stabilize the position of annular valve plate with respect to the fluid passage. The sealing/thrust mechanism reduces axial translations of the input shaft to prevent the annular valve plate from scraping or binding with the walls of the fluid passage.

It is another aspect of the present invention to provide torsion spring mechanisms to rotationally couple the intermediate coupling tube to the input and output shafts. The torsion spring mechanisms have axial and angular flexibility to allow angular and axial translations. In accordance with a specific object, the torsion springs are preloaded to provide a rotational spring force or torque greater than that which the electrical actuator or butterfly valve will exert during normal operation to eliminate substantially all rotational hysteresis and backlash between the input and output shafts.

It is another feature of the present invention to provide an electrically controlled butterfly valve that improves the control of boost pressure provided by an engine turbocharger. Accordingly, a butterfly valve is mounted in an exhaust manifold of an engine to modulate exhaust flow through the turbine of an engine turbocharger. The rotary position of the butterfly valve is controlled by a continuously variable electrical actuator. Appropriate connecting means connect the rotational output of the actuator to the butterfly valve for accurate and fast control of the butterfly valve while thermally isolating the electrical actuator from high temperature fluid that flows through the butterfly valve.

It is another feature of the present invention to provide a method of modulating fluid flow through an engine turbocharger using a butterfly valve. The method includes the steps of producing a continuously variable rotational output using an electrical actuator, closely and directly coupling the actuator output to the butterfly valve while thermally isolating the electrical actuator from the butterfly valve and allowing a range of axial and angular translation between the butterfly valve/input shaft and electrical actuator/output shaft.

These and other objects and advantages of the invention will become more apparent from the following detailed description when taken in conjunction with the accompanying drawings.

BRIEF DESCRIPTION OF THE DRAWINGS

FIG. 5 is a schematic illustration of an electrically controlled butterfly valve incorporated in an engine environment according to a preferred embodiment of the present invention.

Figure 1:
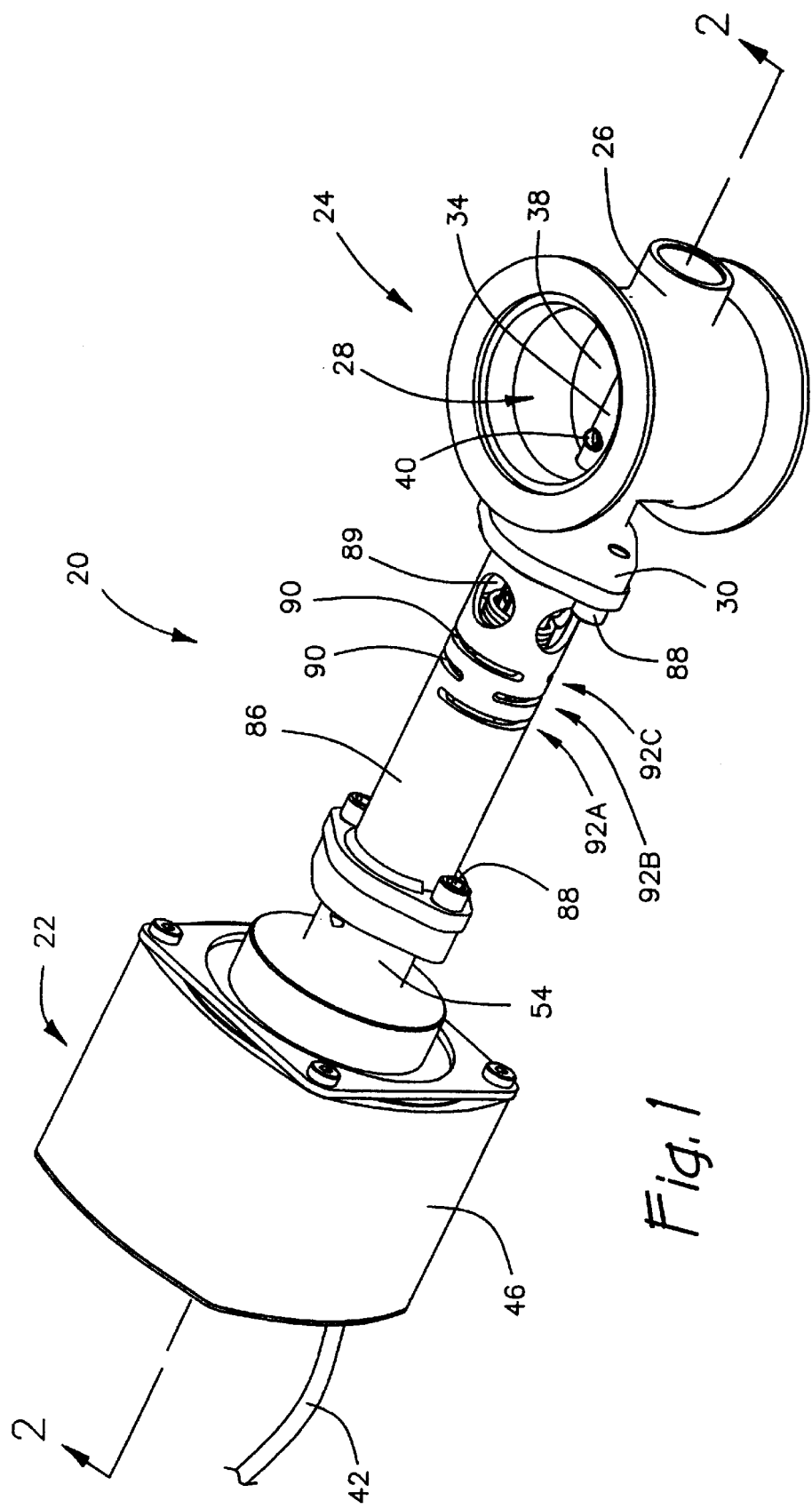
FIG. 1 is a perspective view of an electrically controlled butterfly valve according to a preferred embodiment of the present invention.

While the invention is susceptible of various modifications and alternative constructions, certain illustrative embodiments thereof have been shown in the drawings and will be described below in detail. It should be understood, however, that there is no intention to limit the invention to the specific forms disclosed, but on the contrary, the intention is to cover all modifications, alternative constructions and equivalents falling within the spirit and scope of the invention as defined by the appended claims.

DETAILED DESCRIPTION OF THE PREFERRED EMBODIMENT

For purposes of illustration and referring to FIG. 1, a preferred embodiment of the present invention has been depicted as an electrically controlled butterfly valve apparatus 20 for high temperature applications. Although the preferred embodiment will be described as particularly adapted for controlling exhaust gas flow which may have a temperature of up to about 1400° F., it should be understood from the outset that the preferred embodiment may be adapted for controlling fluid flow in other high temperature engine applications and/or in association with other applications that need thermal isolation between a valve and an electrical actuator. These broader aspects are considered to be part of the present invention, and are covered by certain of the broader claims appended hereto.

Figure 2:
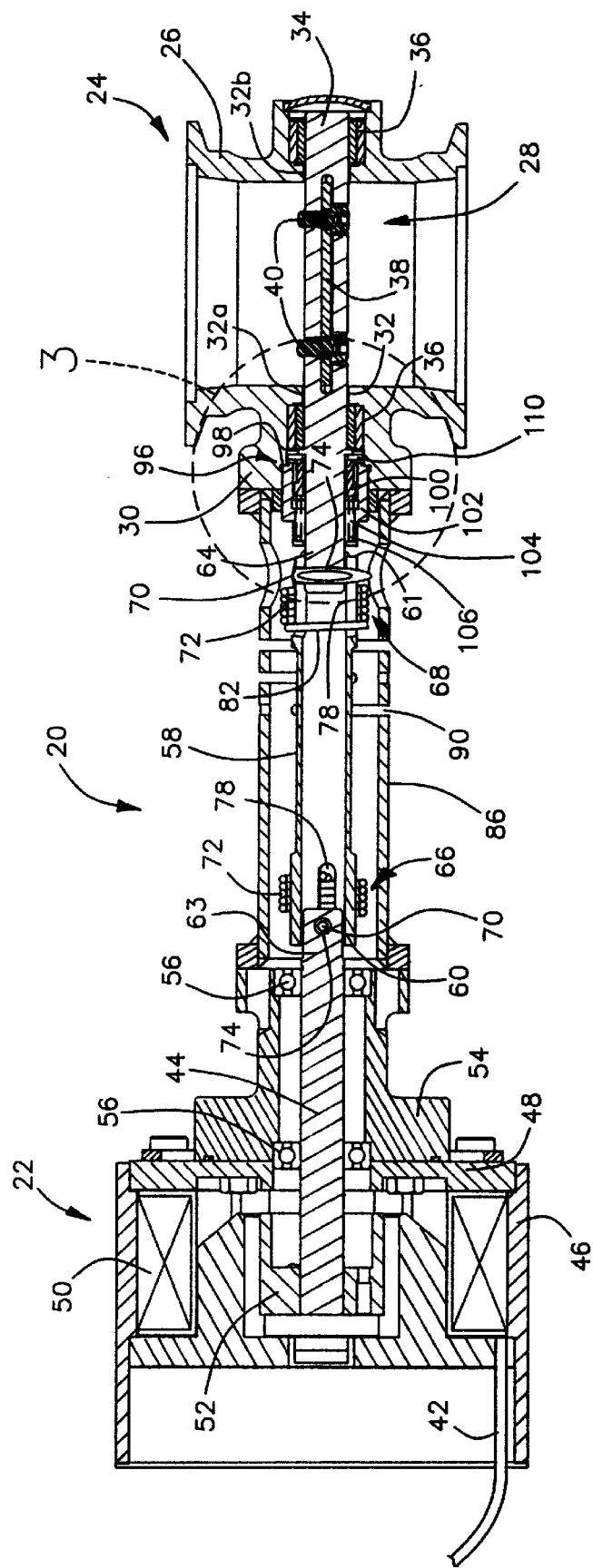
FIG. 2 is a cross-sectional view taken about line 2—2 of the electrically controlled butterfly valve of FIG. 1.

In accordance with the aim of achieving better control of fluid flow in high temperature applications, the preferred embodiment of the present invention generally includes an electrical actuator 22 that has a continuously variable output for varying the rotary position of a butterfly valve 24 or other suitable flow control valve. The butterfly valve 24 includes a generally cylindrical valve body 26, which can be stainless steel or other suitable material, that defines a cylindrical fluid passage 28 or other suitable annular shaped passage for passing high temperature exhaust gas. As used herein, the term annular is meant to include elliptical, oval, circular and any other acceptable curve shape. Referring now to FIG. 2, the valve body 26 includes a drive receiving/mounting portion 30 that extends generally perpendicular to the fluid passage 28. Extending across the valve body 26 and through the drive receiving portion is a cylindrical bore 32, which extends perpendicularly across the fluid passage 28 to include diametrically opposed portions 32a, 32b.

A solid input shaft 34 is mounted in the bore 32 for rotation relative to the valve body 26. The input shaft 34 extends through both diametrically opposed bore portions 32a, 32b and projects out from the drive mounting/receiving portion 30 for receiving the continuously variable rotational output from the electrical actuator 22. The input shaft 34 is journalled between a pair of heat resistant carbon bearings 36 so that the input shaft 34 rotates freely relative to the valve body 26. An elliptical valve plate 38 or other appropriate annular shaped plate is rigidly fixed to the input shaft 34 by a pair of fasteners 40 and closely fitted in the fluid passage 28 for regulating exhaust gas flow through the fluid passage 28. As shown in a fully closed position in FIGS. 1–2, 4, the annular valve plate 38 is aligned to be generally concentric with the fluid passage 28.

The electrical actuator 22 produces the continuously variable output that is directly coupled to the input shaft 34 for fast, accurate and precise control of the butterfly valve 24 and thereby of the exhaust gas flow through the fluid passage 28. The electrical actuator generally includes an electrical input line 42 for receiving electric signals and an output shaft 44 that is driven to a rotational position which is proportionally related to the electric input signals. In the preferred embodiment, the electrical actuator 22 is illustrated as a limited angle torquer (LAT) which converts a 4–20 mA input current to a proportionally related rotary output position of the output shaft 44. As shown in the drawings, the electrical actuator 22 includes an outer casing 46 that contains an inner stator assembly 48, and has a coil assembly 50 connected to the electrical input line 42. The output shaft 44 includes a permanent magnet armature 52 which is responsive to current applied in the coil 50. The electrical actuator 22 also includes a bearing housing 54 fastened to the stator 48. The output shaft 44 is journalled by a pair of steel ball bearings sets 56 in the bearing housing 54, and projects out of the bearing housing 54. In accordance with a particular aspect of the present invention, it is seen that the input and output shafts 34, 44 are coaxially aligned.

In keeping with the aims and objectives relating to accurate control of the butterfly valve position, the input and output shafts 34, 44, are rotationally coupled to directly transfer the continuously variable rotational output of the electrical actuator 22 to the butterfly valve 24. In the preferred embodiment, a change in rotary position of the output shaft 44 simultaneously and correspondingly modifies the rotary position of the input shaft 34 and therefore the valve plate 38. Accordingly, an intermediate coupling tube 58, or other intermediate shaft joins the input and output shafts 34, 44. The intermediate coupling tube 58 provides open ends 60, 61 that readily receive coaxially opposed shaft ends 63, 64 of the output shaft 44 and input shaft 34, respectively.

Figure 4:
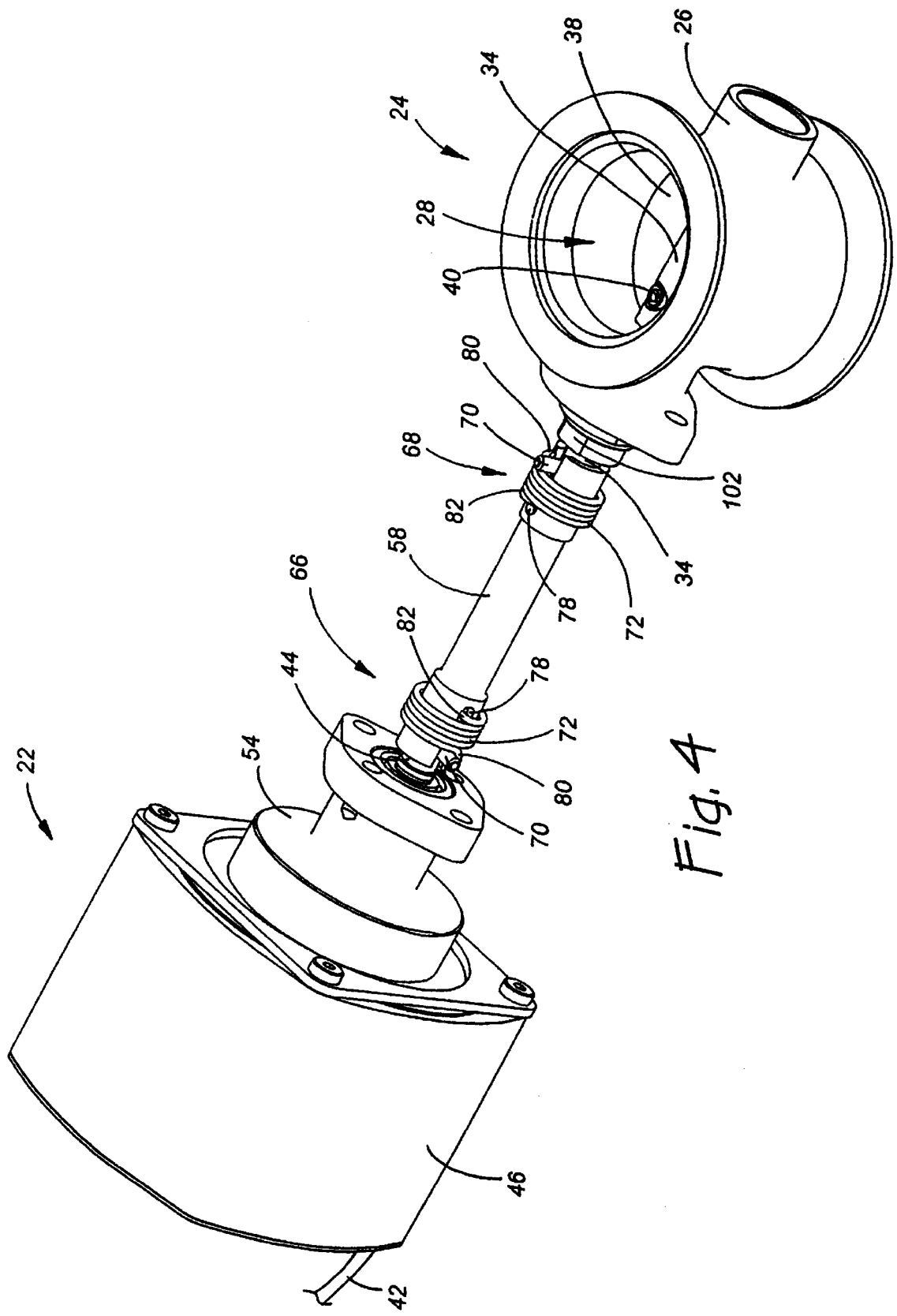
FIG. 4 is a perspective view of the electrically controlled butterfly valve of FIG. 1 with the outer housing tube removed.

To rotationally couple the input and output shafts 34, 44, and referring now to FIGS. 2 and 4, the intermediate coupling tube 58 is connected to the input and output shafts 34, 44 by a pair of torsion spring mechanisms generally indicated at 66 and 68, or other suitable coupling means. In the preferred embodiment, each torsion spring mechanism includes a roll pin 70, or other rigid radially extending member, and a torsion spring 72. The roll pins 70 are pressed in corresponding holes 74 formed in the ends 63, 64 of the respective shafts 33, 44 and fixed to the shafts thereby. The ends of the roll pins 70 ride axially along axially extending slots 78 formed at the open ends 60, 61 of the tube. Each torsion spring 72 is fitted over the coupling tube 58 and has an axially extending outward end 80 which cradles and engages a roll pin 70 through a tangential contact point or line. Each torsion spring 72 also includes an inward end 82 that engages the intermediate coupling tube 58, in this case the inward ends 82 are bent and fitted into the axial slots 78 of the coupling tube 58. The torsion spring mechanisms 66, 68 prevent rotational backlash between the input shaft 34 and output shaft 44. To provide this, each roll pin 70 is loaded between the torsion spring outer end 80 and one edge of the axial slot 78.

To provide direct response without backlash and without rotational hysteresis between the electrical actuator 22 and butterfly valve 24, the torsion springs 72 are preloaded to provide a rotational bias greater than the torque that the electrical actuator 22 and butterfly valve 24 will exert on the coupling tube 58 during normal operation. This prevents rotational hysteresis in the butterfly valve 24 and provides an exact response in the butterfly valve plate 38, which in turn, provides better control over the exhaust flow through the fluid passage 28.

Figure 3:
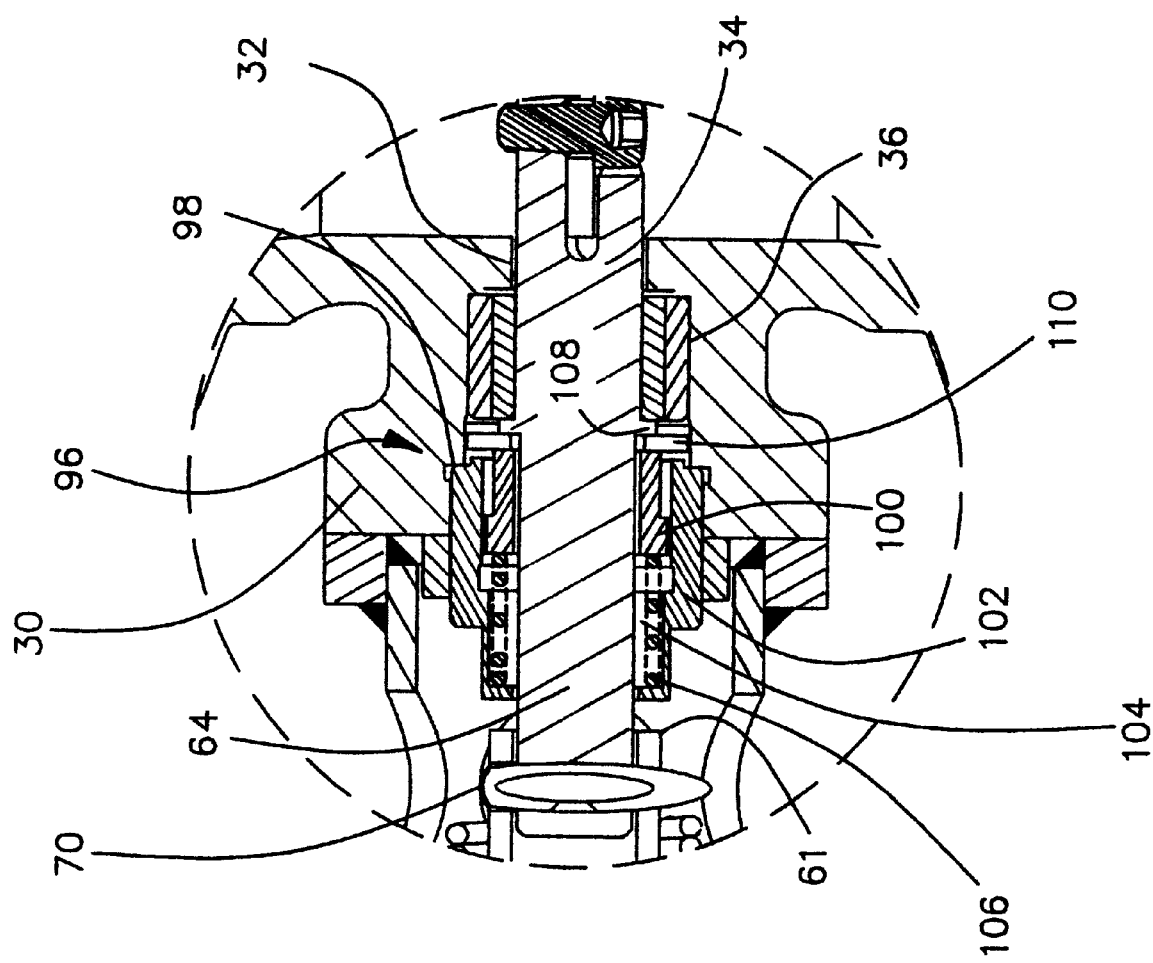
FIG. 3 is an enlarged fragmentary view of the electrically controlled butterfly valve of FIG. 2 identified by the dashed circle 3.

In accordance with a feature of the present invention and referring to FIGS. 1 and 2, the electrical actuator 22 and butterfly valve 24 are built into one integral assembly. Accordingly, an outer housing tube 86 fixes the valve body 26 to the bearing housing 54 of the electrical actuator 22 to prevent rotation therebetween. In the preferred embodiment, the outer housing tube 86 contains the intermediate coupling tube 58 and projecting ends 63, 64 of the input and output shafts 34, 44. The outer housing tube 86 is fastened between the electrical actuator 22 and valve body 26 by sockethead cap screws 88, or other such suitable fasteners. The housing tube 86 also includes a plurality of access openings 89 in close proximity to the drive receiving/mounting portion 30 of the valve body 26 to allow access for disconnecting and connecting the torsion spring mechanism 68. Although a housing 86 is provided in the preferred embodiment, the outer housing tube 86 could be removed (as shown in FIG. 3) to the extent that the butterfly valve 24 and electrical actuator are rigidly fixed to external components.

In operation, high temperature exhaust gas or other fluid can be continuously applied to the fluid passage 28. The electrical current transmitted through line 42 to the electrical actuator 22 is controlled to selectively position the valve plate 38 as desired. In a preferred embodiment, the electrical actuator 22 is continuously variable so that the valve plate 38 may be selectively positioned and selectively held in any position between the fully open and fully closed positions. The position of the valve plate 38 may be updated as desired so that the valve plate 38 modulates flow. The speed at which flow is modulated depends on the particular application of the butterfly valve 24 and the rate at which the electrical actuator 22 responds to electrical input signals.

In a preferred embodiment, the butterfly valve 24 is adapted to pass exhaust gas or other high temperature fluid that can have a temperature of up to approximately 1400° F., while the electrical actuator 22 has an upper temperature limit of approximately 212° F. before failure or malfunction. In accordance with the invention, the electrical actuator is protected from this adverse environment by limiting heat transfer along the control and mounting mechanism. As shown herein, the control or drive mechanism which transfers continuously variable rotational output from the electrical actuator 22 to the butterfly valve 24 is broken into separate thermally isolated drive shafts (input and output shafts 34, 44) with the coupling tube 58, an intermediate shaft or other thermal block therebetween. The contact areas between the coupling tube 58 and the drive shafts 34, 44 are limited to provide at least one and preferably several thermal barriers which restrict heat transfer therebetween sufficient to prevent thermal damage to the electrical actuator 22 for the particular thermal fluid application. In the preferred embodiment, the inner diameter of the end openings of the coupling tube 58 are sized sufficiently larger than the respective outer diameter of the input shaft 34 and output shaft 44 to provide an insulating gap and minimize contact between the coupling tube 58 and the input and output shafts 34, 44. Each insulating gap between the tube 58 and the shafts 34, 44 serves as a primary thermal barrier preventing overheating of the electrical actuator. Moreover, the input and output shafts 34, 44 have only a small end portion slidably fitted into the coupling tube 58 to limit heat transfer therebetween.

Heat restriction and thermal barriers are also provided by the torsion spring mechanisms 66, 68 or other such suitable coupling means that joins the coupling tube 58 to the input and output shafts 34, 44. The torsion spring mechanisms 66, 68 or other coupling means minimizes the metallic contact points and/or metallic cross-sectional metallic areas between the input and output shafts. As can be seen best in FIG. 2 of the preferred embodiment, the torsion springs 72 provide minimum metallic contact points through tangential or other minimum contact with the roll pin 70. The roll pins 70 also only have a metallic tangential contact line to the wall edges of the respective slots 78.

A preferred embodiment also uses metal materials, or other durable materials that have low thermal conductivity to further reduce heat transfer. Accordingly, the materials used for the intermediate coupling tube 58, input shaft 34 and outer housing tube 86 are preferably formed of stainless steel material, or other low thermally conductive rigid material. The valve plate 38 may be formed from Inconel type steel which also has heat resistant qualities.

Another aspect of a preferred embodiment includes the use of radially defined compliance slots 90 on the outer housing tube 86, as may be seen best in FIG. 2. Compliance slots 90 are aligned in adjacent rows 92A, 92B, 92C formed in out-of-phase alignment with one another. As seen there are multiple rows 92A, 92B, 92C of compliance slots 90, each row 92A, 92B, 92C being geometrically rotated by 1200 or other appropriate angle with respect to adjacent rows 92A, 92B, 92C. These compliance slots 90 serve as thermal resistors because the cross sectional area of the outer housing tube 86 is greatly reduced, while the effective thermal conductive length of the outer housing tube 86 is increased. The access orifices 89 also increase the thermal resistance of the outer housing tube 86.

In practicing the preferred embodiment, the electrical actuator is adapted to mount in bracketing (not shown) while the butterfly valve 24 is mounted on piping conduit (shown schematically in FIG. 5). The installation of butterfly valve 24 and electrical actuator are preferably done at room temperature. However, during operation of the electrically controlled butterfly apparatus 20, a significant temperature differential exists between the electrical actuator 22 and the butterfly valve 24. Such temperature differentials can cause axial and angular thermal displacements and misalignments between the butterfly valve 24 and the electrical actuator 22. In addition, the electrically controlled butterfly valve apparatus 20 is adapted for an engine environment (as shown in FIG. 5), and engine vibrations can add additional stress to the axial and angular thermal displacements.

In accordance with the objective of accommodating thermal expansion in the butterfly valve, the preferred embodiment provides a limited range of axial and angular translations of the input shaft 34 relative to the output shaft 44. So that it will be clear, as used herein, angular translations (not to be confused with rotational backlash which the preferred embodiment eliminates) refers to misalignments between the axis of the input shaft 44 and the axis of the output shaft 34. In the preferred embodiment, the end openings of the coupling tube 58 are sized large enough to permit approximately a 2° angle of angular misalignment between the axes of the input and output shafts 34, 44. The roll pins 70 axially ride along the axial slots 78 so that the input shaft 34 can axially translate through a range of positions in the open end 61 without creating axial stresses. Due to the resilient nature of the torsion springs 72, the connection joints between the intermediate coupling tube 58 and the shafts 34, 44 have a range of flexibility to accommodate both axial and angular translations. The out-of-phase compliance slots 90 also provide a limited amount of flexible compliance in the outer housing tube 86 to reduce stresses when small angular and axial displacements occur between the electrical actuator and the butterfly valve 24.

In accordance with another aspect of the present invention and referring to FIGS. 2 and 3, the preferred embodiment provides a sealing/thrust mechanism generally indicated at 96 that eliminates axial translation of the input shaft 34 to stabilize the axial position of the annular valve plate 38 relative to the fluid passage 28. The sealing/thrust mechanism 96 reduces vibrations and large axial translations of the input shaft 34 which could cause the valve plate 38 to bind or scrape against the walls of the fluid passage 28. The sealing/thrust mechanism 96 of the preferred embodiment is formed in an enlarged portion 98 of the cylindrical bore 32. The sealing/thrust mechanism 96 includes an inner sleeve 100 which rides slidably over the input shaft 34 and an outer sleeve 102 that is axially fastened to the valve body 26 and is disposed concentrically over the inner sleeve 100. The outer sleeve 102 and the inner sleeve 100 form a spring chamber 104. A spring 106 is coaxially disposed in the spring chamber to seat the inner sleeve 100 against a seal washer 110. The input shaft 34 also defines a shoulder 108 which receives the axial spring 106 force to stabilize the position of the input shaft 34 and thereby the annular valve plate 38. Compressed between the shoulder 108 and the inner sleeve 100 is a temperature resistant carbon seal washer 110 which acts as a seal to prevent fluid leakage through the bore 32.

Turning to FIG. 5, an exemplary and very significant application of the present invention is schematically illustrated. In accordance with the aim of improving control over engine turbochargers, the electrically actuated butterfly valve apparatus 20 is configured as a wastegate in fluid communication with a turbocharger 200 of an internal combustion engine 202. The internal combustion engine has a compressed air inlet conduit 204 leading to the combustion chambers of the engine 202 and an exhaust gas outlet conduit 206 for discharge. The turbocharger 200 includes a compressor 208 which compresses air to the inlet conduit 204 and a turbine 210 which powers the compressor 208. The turbine 210 is driven by exhaust gas flow through the outlet conduit 206. To control the power of the turbine 210 and thereby the air/fuel ratio in the combustion chambers of the engine 202, there is provided an exhaust gas bypass line 212 which is controlled by the electrically controlled butterfly apparatus 20 that is shown in FIGS. 1–3. The bypass 212 is disposed in fluidic parallel with the outlet conduit 206 to divert exhaust gas flowing to the turbine 210. This controls the operating speed of the compressor 208 and thereby the boost pressure provided by the turbocharger 200 to the engine 202. The exhaust gas flow through the bypass 212 may have temperatures of up to approximately 1400° F. depending upon the particular type of engine.

Although one high temperature application has been shown in FIG. 5, it will be understood that the present invention can be used in a number of applications where thermal isolation of the electrical actuator 22 is needed or where significant range of angular and axial displacements may occur between the electrical actuator 22 and butterfly valve 24. The electrically controlled butterfly valve apparatus 20 has thermal advantages in any application where the fluid being controlled is greater than the temperature limit of the electrical actuator 22, particularly where fluid temperatures through the butterfly approach 100° F. more than the temperature limit of the electrical actuator (which as was mentioned, is limited to about 212° F.), when the possibility of overheating the electrical actuator 22 with only a single shaft becomes very significant. For example, this valve may also be used in controlling compressor 208 bypass and/or turbine 210 bleed operations in internal combustion engines 202. In applications such as controlling compressor 208 bypass, the temperature is much less than 1400° F., although compressed air has a higher temperature than ambient air. In such lower high temperature applications, it will be appreciated to those skilled in the art that the input and output shafts 34, 44 may be directly coupled through one torsion spring mechanism or other rotational coupler thereby eliminating the intermediate coupling tube. The electrically controlled butterfly valve apparatus 20 may also be used in turbine engine applications (not to be confused with turbochargers of internal combustion engines) for modulating fluid flow therein or possibly other such situations which desire an accurate and responsive valve to operate with high temperature fluids.

What is claimed is:

1. An apparatus for controlling fluid flow comprising:
a flow control valve having a valve body, a movable valve member, and an input shaft, the valve body defining a fluid passage, the movable valve member being coupled to the input shaft and rotatable in the fluid passage for regulating fluid flow through the fluid passage;
an electrical actuator having an output shaft and an electrical input, the rotary position of the output shaft being proportionally related to electric signals applied to the electrical input, the output shaft being coaxially aligned with the input shaft;
a rotatable coupling tube coaxial with the input and output shafts; and
coupling means joining the tube with the shafts for restricting heat transfer from the butterfly valve to the electrical actuator.

2. The apparatus for controlling fluid flow as in claim 1 wherein the coupling means provides minimum metallic contact points between the coupling tube and the shafts to thermally isolate the electrical actuator from the flow control valve sufficient to prevent thermal damage to the electrical actuator.

3. An apparatus as in claim 2 wherein the coupling means eliminates substantially all rotational hysteresis between the input and output shafts.

4. An apparatus as in claim 1 wherein the coupling means provides a range of axial translation relative to the output shaft to allow for thermal expansion and contraction of the flow control valve.

5. An apparatus as in claim 4 further including a sealing/thrust mechanism connected to the valve body, the sealing/thrust mechanism engaging the input shaft to reduce axial translation of the input shaft so that the annular plate maintains a substantially constant axial position inside the valve body.

6. An apparatus as in claim 1 wherein the coupling tube defines first and second ends slidably receiving the respective input and output shafts, the first and second ends being rotationally coupled to the respective input and output shafts by torsion spring mechanisms.

7. An apparatus as in claim 1 further including a housing tube surrounding the coupling tube and having flanges at each end thereof respectively fixed to the electrical actuator and the valve body for preventing rotation therebetween.

8. An apparatus as in claim 1 wherein the flow control valve is mounted in close proximity to an engine in fluid communication with an engine turbocharger for regulating boost pressure provided by the engine turbocharger.

9. An apparatus as in claim 1 wherein the flow control valve is a butterfly valve, the fluid passage is cylindrically shaped and the valve member is an annularly shaped plate.

10. An apparatus for modulating the flow of high temperature fluid comprising:
a butterfly valve having a valve body, an annular valve plate, and an input shaft, the valve body defining a fluid passage for interposition along a fluid conduit, the annular valve plate being coupled to the input shaft and mounted for continuously variable rotation in the fluid passage;
an electrical actuator having a continuously variable rotational output on an output shaft,
a rotatable coupling tube joining the output shaft and the input shaft to transfer the continuously variable output from the electrical actuator to the butterfly valve, the coupling tube having at least one thermal barrier imposed therein to reduce heat transfer between the butterfly valve and the electrical actuator; and
a housing fixing the valve body with the electrical actuator to prevent rotation between the valve body and the electrical actuator.

11. An apparatus as in claim 10 wherein the electrical actuator has a temperature limit, the electrical actuator being subject to damage when temperatures in the output shaft of the electrical actuator are above the temperature limit, the fluid passage adapted to pass a thermal fluid having a temperature more than 100° F. above said temperature limit, the coupling tube prevents damage to the electrical actuator during a continuous application of said thermal fluid to the fluid passage.

12. An apparatus as in claim 10 further including a pair of torsion spring mechanisms, one at each end of the coupling tube linking the input and output shafts to the coupling tube, the torsion spring mechanisms being preloaded to a torque greater than that which the butterfly valve and electrical actuator will exert during operation to thereby minimize rotational hysteresis between input and output shafts.

13. An apparatus as in claim 10 wherein the input and output shafts are slidably fitted into respective ends of the coupling tube to allow a limited range of axial and angular translation between the input and output shafts to allow for thermal expansion in butterfly valve during application of high temperature fluid through the fluid passage.

14. An apparatus as in claim 13 further comprising a sealing/thrust mechanism on the input shaft for reducing axial translation of the input shaft to maintain relatively constant the axial position of the annular valve plate relative to the valve body.

15. An apparatus as in claim 10 wherein at least one thermal barrier is an insulating gap providing minimum contact between the coupling tube and a selected one of the input and output shafts.

16. An apparatus as in claim 10 wherein the coupling tube has first and second ends slidably receiving the input and output shafts, respectively, the first and second ends have minimum contact with the input and output shafts to provide first and second primary thermal barriers, respectively.

17. The apparatus as in claim 16 wherein the first and second ends define axially extending first and second slots, the input shaft providing a first rigid member extending radially into the first slot, the output shaft providing a second rigid member extending radially into the second slot, third and fourth thermal barriers disposed between the rigid members and the slots, respectively.

18. An apparatus as in claim 10, wherein the housing is an outer tube surrounding the coupling tube, the input shaft and the output shaft, the outer tube defines a plurality of apertures selectively arranged to provide increased thermal resistance.

19. An apparatus as in claim 11 wherein the butterfly valve continuously passes a fluid having a temperature of approximately 1400° F. without damage to the electrical actuator.

20. An apparatus as in claim 10 wherein the butterfly valve is connected to an exhaust manifold of an internal combustion engine to modulate exhaust gas flow through an engine turbocharger.

21. An apparatus for modulating the flow of high temperature fluid, comprising;
 a butterfly valve having a valve body, an annular valve plate, and an input shaft, the valve body defining a fluid passage, the annular valve plate being coupled to the input shaft and mounted for continuously variable rotation in the fluid passage for modulating the flow of high temperature fluid through the fluid passage;
 an electrical actuator having an electric input and an output shaft for continuously variable movement, the rotary position of the output shaft being proportionally related to the electric input;
 a housing fixing the valve body with the electrical actuator to coaxially align the input and output shafts; and
 an intermediate rotatable shaft interposed between the input and output shafts, the intermediate shaft joined to the input and output shafts to transfer continuously variable movement from the electrical actuator to the butterfly valve while thermally isolating the electrical actuator from the butterfly valve, the input shaft having a limited range of axial and angular translation relative to the output shaft to allow for thermal expansion of the butterfly valve.

22. An apparatus as in claim 21 wherein the intermediate shaft is a tube coaxially interposed between the input and output shafts, the input and output shafts slidably fitting into respective first and second ends of the coupling tube.

23. An apparatus as in claim 22, wherein the tube defines first and second axially extending slots at the first and second ends, respectively, the output shaft providing a first member slidably fitted in the first axially extending slot, the input shaft providing a second member slidably fitted in the second axially extending slot.

24. An apparatus as in claim 23 further comprising first and second torsion springs, the first torsion spring fixed to the tube and engaging the first member, the second torsion spring fixed to the tube and engaging the second member.

25. An apparatus as in claim 24 wherein said first and second torsion springs are preloaded to a torque greater than the torque exerted by either of the input or output shafts during normal operation of the butterfly valve to thereby minimizing rotational hysteresis between the output shaft and input shaft.

26. An apparatus as in claim 21 further comprising carbon bearings carried by the valve body, the input shaft being journalled in carbon bearings.

27. An apparatus as in claim 21, further including a sealing/thrust mechanism connected to the valve body and engaging the input shaft to reduce axial translation of the input shaft so that the annular plate maintains a substantially constant position inside the valve body.

28. An apparatus as in claim 27 wherein said sealing/thrust mechanism comprises an inner sleeve, an outer sleeve and a spring, and wherein the input shaft provides a shoulder, the inner sleeve being slidably positioned over the input shaft, the outer sleeve axially fixed to the valve body and positioned over the inner sleeve to form an annular chamber, the spring being coaxially mounted in the annular chamber to urge the inner sleeve against the shoulder.

29. An apparatus as in claim 21 wherein the housing is tube shaped and defines a plurality of compliance slots aligned radially about the housing in rows, the rows being aligned in an out-of-phase relationship with one another.

30. An electrically actuated butterfly valve for modulating high temperature fluid, comprising:
 a continuously variable electrical actuator having a continuously variable electrical output on an output shaft;
 a butterfly valve comprising a valve body, an input shaft axially aligned with the output shaft, and an annular valve plate, the annular valve plate mounted to the input shaft for rotation relative to the valve body, the valve body defining a flow passage in which the annular valve plate is rotatable for regulating flow through the flow passage;
 a housing securing the electrical actuator to the valve body; and
 means for joining the first and second shafts to position the annular valve plate in response to the continuously variable output, said joining means providing a thermal barrier including at least one minimum contact to prevent transfer of heat from the butterfly valve to the electrical actuator along the input and output shafts.

31. The electrically actuated butterfly valve of claim 30 wherein said joining means comprises a rotatable tube axially interposed between the input and output shafts, the input and output shafts inserted into and connected to the respective first and second ends of the coupling tube.

32. The electrically actuated butterfly valve of claim 31, wherein the tube defines first and second axially extending slots at the first and second ends, respectively, the output shaft providing a first projecting member slidably fitted in the first axially extending slot, the input shaft providing a second projecting member slidably fitted in the second axially extending slot.

33. The electrically actuated butterfly valve of claim 32 further comprising first and second torsion springs disposed coaxially over the shaft and the tube, the first torsion spring engaging the first projecting member and biasing the tube in a first rotational direction, the second torsion spring engaging the second projecting member and biasing the tube in a second rotational direction.

34. The electrically actuated butterfly valve of claim 33 wherein said first and second torsion springs are preloaded to a torque greater than the torque exerted by either of the input or output shafts during normal operation of the butterfly valve to thereby eliminate all rotational hysteresis between the output shaft and input shaft.

35. The electrically actuated butterfly valve of claim 34, further including a sealing/thrust mechanism connected to the valve body and engaging the input shaft to reduce axial translation of the input shaft so that the annular plate maintains a substantially constant position inside the valve body.

36. The electrically actuated butterfly valve of claim 35 wherein said sealing/thrust mechanism comprises an inner sleeve, an outer sleeve and a spring, and wherein the input shaft provides a shoulder, the inner sleeve being slidably positioned over the input shaft, the outer sleeve axially fixed to the valve body and positioned over the inner sleeve to form an annular chamber, the spring being coaxially mounted in the annular chamber to urge the inner sleeve against the shoulder.

37. An apparatus as in claim 30 wherein the housing is tubular and defines a plurality of compliance slots aligned radially about the housing in rows, the rows being aligned in an out-of-phase relationship with one another.

38. An electrically actuated butterfly valve for modulating high temperature fluid, comprising:

a continuously variable electrical actuator having a continuously variable electrical output on an output shaft;

a butterfly valve comprising an valve body, an input shaft axially aligned with the output shaft, and an annular valve plate, the annular valve plate mounted to the input shaft for rotation relative to the valve body, the valve body defining a flow passage in which the annular valve plate is rotatable for regulating flow through the flow passage;

a housing securing the electrical actuator to the valve body; and wherein the input shaft and the output shaft are joined through at least one minimum contact to provide a thermal barrier between the butterfly valve and the electrical actuator.

39. The electrically actuated butterfly valve of claim 38 wherein the input shaft is fixed relative to the output shaft by a spring means during electrical actuation of the butterfly valve, thereby ensuring no rotational hysteresis between the input shaft and the output shaft.

40. The electrically actuated butterfly valve of claim 38 wherein there is at least two minimum contacts.

* * * * *